Figure 1:
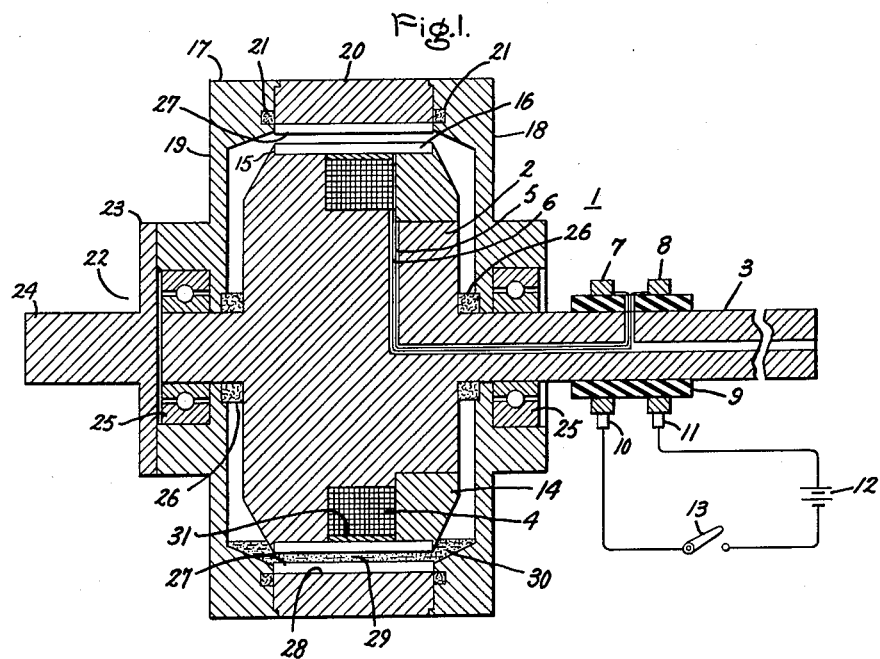

Feb. 14, 1956  K. E. WAKEFIELD  2,734,603
MAGNETIC FLUID CLUTCHES

Filed Sept. 29, 1950  3 Sheets-Sheet 1

Inventor:
Kenneth E. Wakefield,
by Paul A. Frank
His Attorney.

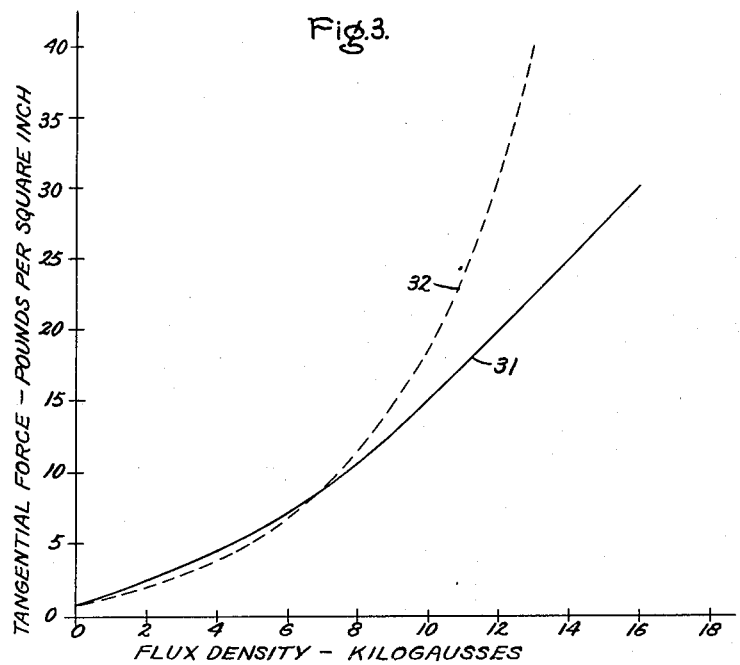
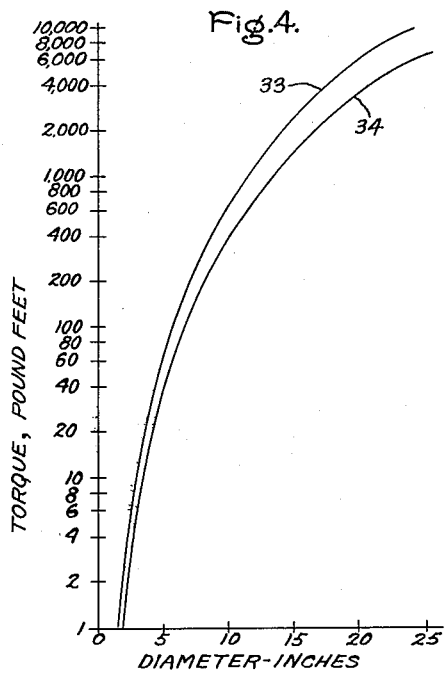
Inventor:
Kenneth E. Wakefield,
by Paul A. Frank
His Attorney.

Feb. 14, 1956  K. E. WAKEFIELD  2,734,603
MAGNETIC FLUID CLUTCHES
Filed Sept. 29, 1950  3 Sheets-Sheet 3

Inventor:
Kenneth E. Wakefield,
by Paul G. Frank
His Attorney.

United States Patent Office 2,734,603
Patented Feb. 14, 1956

2,734,603

MAGNETIC FLUID CLUTCHES

Kenneth E. Wakefield, Schenectady, N. Y., assignor to General Electric Company, a corporation of New York Application September 29, 1950, Serial No. 187,577

3 Claims. (Cl. 192—21.5)

This invention relates to clutches. More particularly it relates to clutches which use a magnetic fluid medium to engage and disengage the driving and driven members and to an improvement in the design of such clutches.

The usual magnetic fluid clutch consists essentially of parallel magnetic surfaces separated by a small gap which is filled with a mixture of magnetizable fluid consisting of an oil and finely divided magnetic material such as iron. The surfaces may comprise juxtaposed parallel discs, a rotor within a cylinder, concentric cylinders, or parallel surfaces of other configurations which are relatively rotatable about a common axis. The unit contains an electromagnetic coil to produce the magnetic flux in the gap between the members. When the coil is not energized, the only force restraining relative rotation between the two surfaces is that produced by the viscous drag of the fluid in the gap. When the coil is energized, the magnetic particles in the fluid are attracted to one another and to the magnetic driving and driven members by magnetic influence, binding the members together and permitting the transmission of power to an output shaft. The device may also be used as a brake when the driven member is held in a fixed position.

While magnetic fluid clutches have been eminently successful in many applications, as now constructed they are subject to several limitations. One of these limitations is caused by slippage between the magnetized fluid and the driving and driven members and manifests itself in reduced tangential force between the fluid and the rotating members. This places a low limit on the possible output torque.

Another limitation of the conventional magnetic fluid clutch is the excessive heating of the magnetic fluid under slip conditions. This heating is particularly noticeable in and is confined to that part of the magnetic fluid immediately adjacent the driving and driven member surfaces and may result in the breakdown or degeneration of the fluid.

A further limitation of the magnetic fluid clutch as now constructed is a tendency for the iron or magnetic particles in the magnetic fluid to centrifuge outwardly during operation of the clutch, often permanently locking the co-acting clutch surfaces together or to settle out when the unmagnetized fluid is at rest.

It is an object of this invention to increase the output torque of magnetic fluid clutches.

Another object of the present invention is to provide a magnetic fluid clutch wherein heat transfer from the region of the surface of the rotating surfaces is enhanced.

It is also an object of this invention to provide a magnetic fluid clutch wherein, under slip conditions with the magnetic fluid unmagnetized, the latter is maintained in a mixed condition.

It is a further object of this invention to provide a magnetic fluid clutch wherein the tendency of the rotating members to slip relative to the magnetic fluid when the latter is magnetized is decreased.

It is a still further object of the invention to reduce the tendency towards centrifuging the iron particles in the fluid when the latter is not magnetized.

Figure 2:
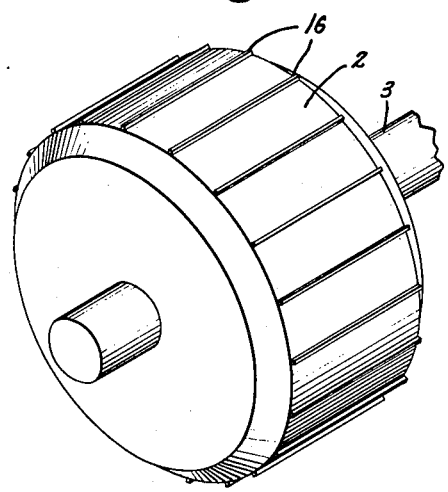
Figure 5:
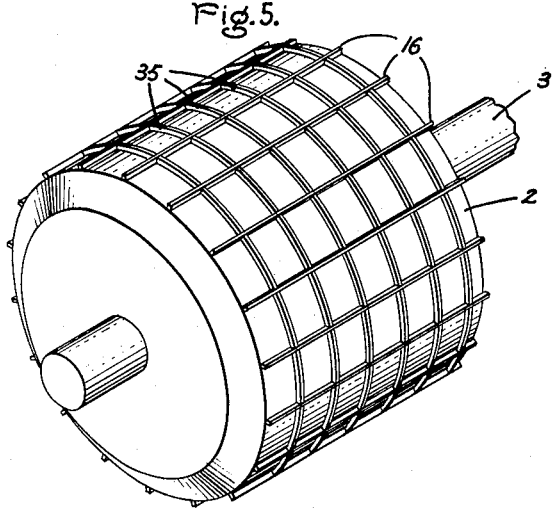
Figure 6:
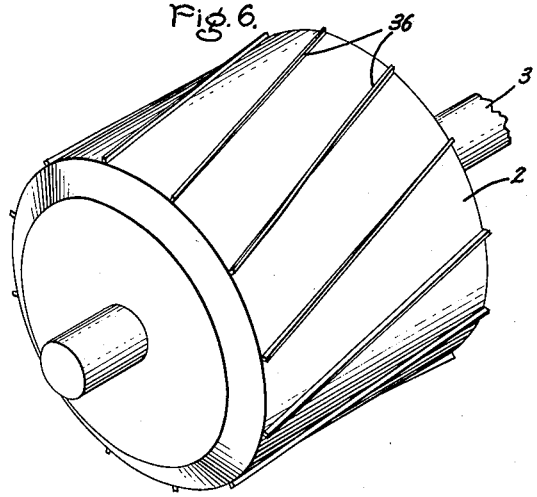
Figure 7:
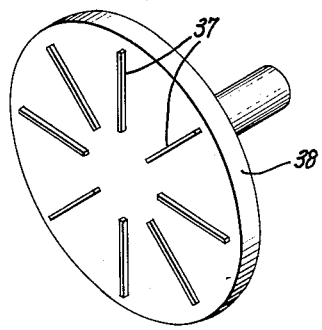

Other objects will become apparent from a consideration of the following description and the drawing. Fig. 1 is a side elevation, cross-sectional view of a typical magnetic fluid clutch embodying the present invention. Fig. 2 is a perspective view of the driven rotor of a magnetic fluid clutch illustrating the present invention. Fig. 3 is a plot of tangential force exerted on the driven member of the clutch versus the flux density. Fig. 4 is a logarithmic plot of torque output versus rotor diameter. Figs. 5 through 7 are illustrative of variations in the arrangement of the components of this invention.

It has been found that the foregoing objects may be readily accomplished by providing ribs on the opposing clutch surfaces. More particularly, it has been found that the above objects may be realized by placing projections or ribs of non-magnetic material on the opposing surfaces of magnetic fluid clutches.

Magnetic fluid clutches have been made heretofore with various types of finishes on the opposing surfaces. For example, the surfaces have been polished, machine finished, and even roughened with serrations. It was found that the serrated surface actually decreased the tangential force at the surface of the clutch member, causing a reduction in the power output of the clutch.

It has now been found that if ribs or teeth of non-magnetic material such as brass, copper, or other material, which can withstand the forces involved, are placed on, embedded in, affixed to, or formed in the clutch surfaces, the tendency toward slippage between the magnetized fluid and the clutch surfaces at their interfaces is decreased and the driving force proportionally increased. Under slip conditions the ribs or teeth serve to mix the magnetic fluid and prevent the creation of an overheated layer of fluid contiguous to the rotating driving surface, provide fin-like surfaces for the dissipation of heat from the magnetized fluid, and may even be used to circulate the fluid along the clutch surface and through a cooling reservoir. These ribs or teeth are to be distinguished from the grooves set forth in copending application Serial No. 188,009, now Patent No. 2,605,876, issued August 5, 1952 assigned to the same assignee as the present invention.

It is essential, in order to realize the full benefit of this invention, that ribs be of non-magnetic material. It will be appreciated that the presence of magnetic ribs would cause cyclic variations in the torque produced by changes in the reluctance of the magnetic path as the rib surfaces move relative to one another. If magnetic teeth are used, there is also a reduction in possible torque inasmuch as the flux tends to pass through the projecting teeth instead of through the relatively much larger surfaces between the teeth. On the other hand, using non-magnetic ribs, the only influence changing the reluctance of the magnetic path is due to the very shallow channels in the surface which might be used to receive the ribs. However, since the channels or slots in which the ribs are fixed are very shallow and very narrow compared to the distance between ribs, there is little or no deviation of the magnetic flux lines. Of course, if the ribs or teeth are formed in the surface itself this latter effect will be entirely absent. In a typical installation, using a six inch diameter rotor as the driven member, the ribs project about 0.020 inch above the surfaces of the driving and driven members. The slots in which the ribs are based are about 0.040 inch deep while the width of the ribs is about 0.032 inch. When it is considered that the distance between ribs is typically 0.625 inch in such an installation, or about 20 times the rib width, it will be appreciated that the influence exerted on the magnetic flux path by the ribs is negligible. If it is desired still further to reduce the small amount of influence due to the slots forming in effect low projecting ribs or poles of magnetic material, the number of teeth on the driven and driving surfaces may be made unequal in number. Thus the driving member may have 40 slots while the driven surface has only 39 slots. The net effect here is to reduce even more the already negligible cyclic variation of the torque.

The operation of the invention will be better understood by reference to the drawing. In Fig. 1 there is shown in cross-section a typical cylinder-rotor type magnetic fluid clutch embodying the present concept. The driven member 1 comprises a rotor 2 of magnetic material such as iron, having fixed thereto or integral therewith an output or driven shaft 3. Rotor 2 is magnetized by means of an electromagnetic coil 4 mounted within the periphery of the rotor as shown and connected by leads 5 and 6 through a conduit in the rotor 2 and shaft 3 to slip rings 7 and 8 fixed in shaft 3 and insulated from one another and from the shaft 3 by an insulating member 9. Slip rings 7 and 8 are connected through contact brushes 10 and 11 to a unidirectional voltage source 12 through switch 13.

In order to facilitate the mounting of coil 4 within rotor 2, a portion of the rotor may be cut away to form a recess as shown to receive the coil which is held in place by a ring 14 fixed to the rotor in any convenient manner as by bolting and non-magnetic ring 31. Mounted lengthwise in slot 15 and the periphery of rotor 2 are ribs 16 of non-magnetic material with their length disposed axially along the rotor and their height extending radially. These ribs are better shown in Fig. 2 which is a perspective view of driven member 1. As pointed out above, in a typical installation as shown having a six inch diameter rotor, slots 15 are about 0.040 inch deep and the ribs seated in the slot project about 0.020 inch above the circumference of the rotor. In the typical arrangement the ribs 16 are about 0.032 inch wide and spaced about 0.625 inch apart, measuring from their centers. A six inch diameter rotor would then have about 30 ribs or projections arranged about its circumference. It will be understood that the above details are for the purpose of a specific example only and that the dimensions of the ribs and their spacial arrangement may be varied considerably. In general, the ribs should not project a distance from the rotor which is more than about one-quarter of the gap distance between the driving and driven members. In other words, the ribs, projections, or teeth on one face are in spaced relationship with and do not interlock with those on the co-acting face. It should also be borne in mind that the circumferential space between ribs should be great compared to the width of the ribs.

The driving member 17 as shown is in the form of a cage which surrounds driven member 1 and output shaft 3. Driving member 17 is constructed of a number of fitted components. The ends 18 and 19 of the cage-like driving member are of non-magnetic metal and have fitted between them as shown a ring 20 of magnetic metal which is dovetailed in place and fitted with seals 21 to prevent the passage of liquid through the joint. An input shaft member 22 comprising a flange 23 and input shaft 24 is fixed to member 19. Bearings 25 are placed between the shaft of the driven member and the driving member as shown. Shaft seals 26 serve to prevent the flow of liquid along the shafts from the space between the driven and driving members. Ribs or projections 27 similar to ribs 16 of the rotor are placed in the inner periphery of ring 20 in which receiving slots 28 are cut.

The space 29 between the driving and driven members is filled with a normally fluid iron-oil mixture 30. Typical proportions of such mixtures are five to seven parts by weight of carbonyl "E" iron powder to one part by weight of SAE 10 petroleum oil. In place of petroleum oil other oils including vegetable oils and synthetic oils may be used, the particular characteristics of the fluid being varied to suit specific installations.

As in the operation of the usual magnetic fluid clutch, a rotating force or torque is applied to input shaft 24. With coil 4 unenergized, the driving member 17 merely rotates about driven member 1 and no rotational tangential force is transmitted to the latter except from a negligible force attributable to the viscous drag of fluid 30. However, when coil 4 is energized by closing switch 13, the particles of magnetic metal in fluid 30 magnetize and align themselves in a myriad of chains between the now magnetized magnetic rotor 2 and magnetic ring 20 of the driving member in effect to combine the driving and driven members into a unitary system. Under such conditions, any torque applied to input shaft 24 is transferred through fluid 30 to driven member 1 and causes output shaft 3 to rotate.

In actual practice, using a magnetic fluid clutch of the type shown in Fig. 1 but without the magnetic ribs or teeth of the present invention, the tangential force in pounds per square inch varies with the flux density in kilogausses as shown in curve 31 of Fig. 3. On the other hand, when the parallel co-acting magnetic surfaces or clutches are fitted with the present ribs or projections as described above, the tangential force per square inch of area is increased substantially at flux densities above seven kilogausses as shown in curved 32.

The torque in pound-feet for usual magnetic fluid clutches and rotors of various diameters is shown in curve 34 of Fig. 4. Reference to curve 33 which gives corresponding values for clutches of the present invention having projections or ribs described herein, reveals that a substantial increase in torque is realized by the use of the ribs. For example, the increase in torque with a clutch having a five inch diameter rotor is about 50%. This increase is typical of clutches having rotors of other diameters. The curves of Fig. 3 as well as Fig. 4 were obtained using a fluid consisting of five parts by weight of carbonyl "E" iron powder and one part by weight of silicone oil.

While the ribs or teeth of the present invention have been described herein as having a particular configuration, that is, arranged axially along the driving cage and the driven rotor of a magnetic fluid clutch, other configurations may be used to obtain the benefit of increased torque as well as to promote the mixing of the magnetic fluid. As pointed out above, under prolonged slip conditions while the fluid is magnetized there is a tendency for the layer of iron-oil fluid contiguous to the rotating driving member to become heated. The temperature of such layer may rise to as high as 300° or 400° resulting often in a physical and chemical breakdown of the oil component. It has been found that the present ribs have a salutary effect in keeping the magnetized fluid well mixed under such slip conditions and promotes the transfer of heat from heated layer to the rest of the fluid and to the other parts of the clutch. It has also been found that the cooling of the magnetized fluid may be enhanced by placing ribs or projections at right angles to those which extend axially along the co-acting surfaces. One such configuration of ribs is that in Fig. 5 wherein rotor 2 is depicted as having rectangular, axially arranged ribs 16 and in addition ribs 35 disposed at right angle to ribs 16. Such an arrangement produces an increase in torque over a smooth engaging surface and at the same time enhances the mixing and cooling of the magnetized fluid.

In certain applications it is desirable that the fluid be circulated from one end of the rotor to the other along the engaging surfaces. In such case the straight ribs 16 may be replaced by ribs 36 of Fig. 6 arranged helically around the periphery of the rotor to force the fluid over the surface, thus distributing the heat more uniformly throughout the system. The ribs 36 add substantially to the torque produced when the fluid is magnetized. It will be understood of course that the ribs above described are placed on the driving as well as the driven surface.

The benefits of the present invention are obtainable when using disc and other type magnetic fluid clutches as well as the rotor type most particularly described herein. For example, ribs on the disc type clutch 37 in Fig. 7 may be arranged radially on the face of driven disc 38 as well as on the corresponding driving member. Other specific arrangements of the ribs or projections will occur to those skilled in the art. The present ribs may also be employed in clutches wherein the engaging surfaces are in the shape of cones, hemispheres and the like. If the height of the present ribs or teeth is maintained at not more than about one-quarter of the gap distance there is little or no increase in the viscous drag of the fluid over ordinary surfaces.

The ribs of the present invention also are useful in that by keeping the unmagnetized fluid in a mixed condition when the driving member is in motion with the driven member stationary, the tendency of the magnetic particles in the fluid to centrifuge or settle out is counteracted. Consequently, there is less occasion, using the present ribs, for the surfaces to jam or lock due to packing of the magnetic particles between the co-acting surfaces.

By this invention there are provided magnetic fluid clutches which produce an output torque substantially larger than that produced by conventional types of magnetic clutches. There are provided also clutches in which the unmagnetized fluid is kept mixed and heat transfer enhanced under slip conditions. At the same time centrifuging tendencies of the fluid are reduced. There are provided also means for circulating the unmagnetized fluid along the face of the clutch surfaces during slip conditions.

While the present invention has been described with reference to certain embodiments, it is to be understood that it is desired to protect herein all those modifications obvious to those skilled in the art which do not depart from the spirit and scope of the invention.

What I claim as new and desire to secure by Letters Patent of the United States is:

1. In combination, a pair of members spaced with their faces in juxtaposition and relatively rotatable on a common axis, one member comprising a magnetic material having embedded therein an electromagnet, means to energize said electromagnet, said one member having a shaft connected thereto, the other member comprising a magnetic material and having a shaft connected thereto, and a magnetic fluid comprising a mixture of a magnetic powder and a lubricant in the space between the faces of said spaced members, whereby when said electromagnet is energized, flux passes between said members through said fluid tending to bind said members for transmission of torque between said shafts, the faces of said members having ribs affixed thereto in mutually spaced relation, said ribs being positioned at an angle to the direction of fluid flow during relative rotation of said members to create turbulence in the flow of said magnetic fluid, and said ribs being non-magnetic to prevent cyclic variations in said flux passing between said members whereby cyclic variations in torque produced in one shaft by rotation of the other is prevented.

2. In a magnetic fluid clutch, a pair of spaced members relatively rotatable on a common axis and having faces in juxtaposition, a magnetic fluid comprising a mixture of a magnetic powder and a lubricant between the faces of said members, and teeth affixed to the co-acting faces of said spaced members, said teeth being of non-magnetic material so as to prevent production thereby of cyclic flux and torque variations upon relative rotation of said faces, said teeth on one face being in spaced relation to those on the juxtaposed face, the height of said teeth being no more than one fourth of the distance between said spaced members, and being angularly disposed to the direction of fluid flow whereby turbulent flow is imparted to the fluid passing between said teeth.

3. In a magnetic fluid clutch, a pair of spaced members relatively rotatable on a common axis and having coacting faces in juxtaposition, a magnetic fluid comprising a mixture of a magnetic powder and a lubricant between said faces, and helically arranged, axially extending ribs on said faces, said ribs being of non-magnetic material so as to prevent production thereby of cyclic flux and torque variations upon relative rotation of said faces, the ribs on one face being in spaced relation to those on the coacting face, both sets of ribs being angularly disposed to the direction of fluid flow between faces whereby turbulence is imparted to said magnetic fluid.

References Cited in the file of this patent

UNITED STATES PATENTS

| 473,042 | Willans | Apr. 19, 1892 |
| 1,101,997 | Church | June 30, 1914 |
| 2,525,571 | Winther | Oct. 10, 1950 |
| 2,543,394 | Winther | Feb. 27, 1951 |
| 2,604,964 | Winther et al. | July 29, 1952 |
| 2,605,876 | Becker | Aug. 5, 1952 |

FOREIGN PATENTS

| 976,917 | France | Nov. 1, 1950 |
| 677,726 | Great Britain | Aug. 20, 1952 |

OTHER REFERENCES

Bureau of Standards Technical Report 1213, National Bureau of Standards, Washington, D. C. (Copy received in the Patent Office March 30, 1948.)

Supplemental Information on Magnetic Fluid Clutch, National Bureau of Standards, May 9, 1949.

Magnetic Fluid Clutch, K. E. Wakefield, General Electric Review, December 1949, pages 39 to 43.